United States Patent Office 3,720,852
Patented Mar. 13, 1973

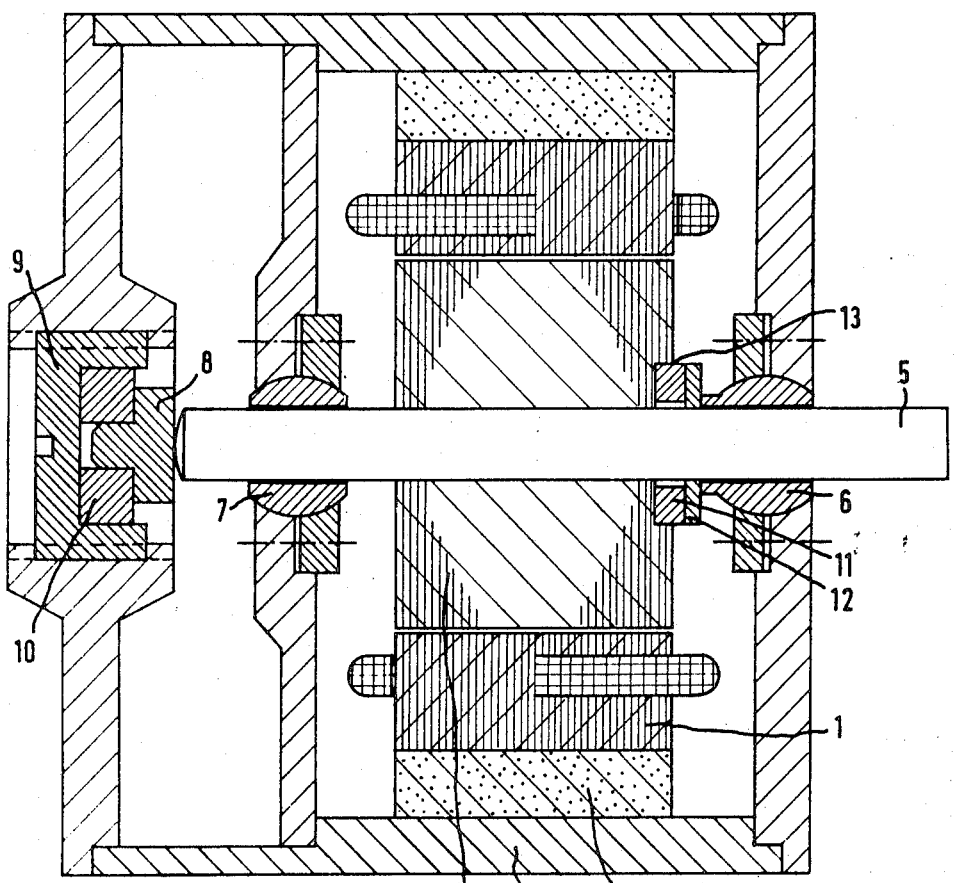
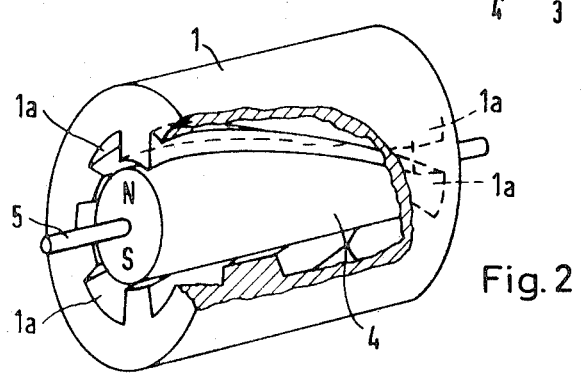
Fig. 1
Fig. 2

3,720,852
DEVICE FOR DAMPENING OSCILLATIONS
IN A MIDGET MOTOR
Gunther Vieweg, Nuremberg, Friedrich Kappius, Nuremberg-Eibach, and Hans Ott and Jurgen Wenk, Nuremberg, Germany, assignors to Siemens Aktiengesellschaft, Berlin and Munich, Germany
Filed Mar. 30, 1971, Ser. No. 129,539
Claims priority, application Germany, Apr. 9, 1970,
P 20 16 866.5
Int. Cl. H02k 5/16
U.S. Cl. 310—90                     3 Claims

ABSTRACT OF THE DISCLOSURE

A midget motor comprises a rotor, a stack of slotted stator laminations, the rotor being obliquely inclined with respect to the slots of the stator, a stop means for the rotor and a bearing means bearing against one end of the shaft of the rotor, the stop and bearing means connected to the housing of the motor for elastic members for isolating the oscillatory movement of the rotor from the housing.

---

Our invention relates to a midget motor, and more particularly, to a small sized motor in which mechanical oscillatory movement of the members thereof are effectively damped.

In many applications of small sized motors used as drivers especially drives for sound reproducing equipment, the quietness of the driving motor is extremely important to minimize the effect of the motor on the sound reproduced. In this equipment, where a transmission arrangement is coupled between the motor and the drive member of the sound carrier, the motor is often suspended to separate the oscillatory noise produced by the motor components from the equipment. This is not possible, however, if the sound carrier is directly driven by the shaft of the motor, since the motor is then, rigidly coupled with the housing. In this situation, the oscillating electromechanical movement of the rotor and stator must be damped in the motor itself.

A published publication discloses a brushless DC motor where the rotary oscillations, which are superimposed on the rotating movement of the rotor, are damped through an oscillation-insulated mounting of the rotor magnet.

For this purpose, strips of flexible material are inserted between the rotor magnet and the magnet carrier and the rotor magnet is suspended on leaf springs. The damping effect on the springs is very limited, however, due to their slight thickness. Though a better oscillation insulation is obtained with these flat springs, the suspension of the rotor magnet on the springs is very complicated to make and correspondingly, is expensive.

An object of our invention is to produce a motor of the aforementioned type, which will provide effective isolation of the oscillations thereof with relatively simple and inexpensive means.

Other objects, advantages and features of our invention will become more apparent from the following description.

To this end and in accordance with our invention, there is provided a motor in which slots of a stack of slotted stator laminations are coupled to the motor housing and poles of the rotor are arranged obliquely to the slots by at least one slot division.

In addition, a stop for limiting axial movement of the rotor at a minimum is provided for the rotor which also damp the axial oscillations of the rotor.

To keep the friction losses in such motors as low as possible, it is preferable that the pivots be provided with a bearing plate having relatively friction free movement, which is to be connected with the housing via an elastic intermediate member. According to another feature of this invention, the mounting of the motor is further simplified so that the bearing for the rotor is axially displaceable, at the housing. A displacement of the bearing is preferably obtained by elastically connecting the bearing plate with a regulating screw.

The stop may consist of a buffer disc which is connected to the rotor via an elastic intermediary ring. An extension of the axial over-all length of the motor may be avoided by locating the intermediate ring inside a recess of the rotor.

The above mentioned and other objects, advantages and features of our invention, said features being set forth with particularity in the claims annexed hereto, will be apparent from, and will be mentioned in, the following description of embodiments of the invention illustrated by way of example on the acompanying drawings in which:

FIG. 1 is a sectional view through the housing of a motor constructed in accordance with the principles of our invention; and FIG. 2 is a partial perspective end view of the rotor and stator of the motor of FIG. 1.

Referring to the drawings, and in particular FIGS. 1 and 2, a stator formed of a stack of laminations 1, with bevelled slots 1a is connected via an elastic intermediate member 2, with the housing 3 of the motor. A permanent magnet rotor 4 having the N-S poles indicated in FIG. 2, is carried on a shaft 5 which communicates with two bearings 6 and 7 located at opposite sides of stator 4. The direction of the slots 1a is oblique to the axial direction of the rotor shaft 5, as best seen in FIG. 2, by at least one slot division.

One end of the shaft 5 bears against a bearing plate 8 which is held in place by an elastic ring 10, for example, made of rubber. The plate 8 and the ring 10 are axially aligned with the shaft 5, and the ring 10 is inserted inside the axially aligned cup-shaped end of a bearing screw 9. This end of the shaft 5 is journalled in the bearing means comprising the above-identified elements.

A recess 13 is provided in the rotor 4 on the same side as bearing 6 and an elastic type intermediate ring 11 is placed in said recess. The shaft 5 passes through ring 11 and cooperates with an axially aligned buffer disc 12 located contiguous to the ring 11. Buffer disc 12 cooperates with shaft 5 and serves as a stop therefor.

The axial oscillations of the permanent magnet rotor produced by the bevelled slots 1a are isolated in a simple manner by the elastic intermediate ring 11 of the disc 12 and the elastic intermediate ring 10 of the bearing plate 8. The elastic intermediate layer 2 between the stack of slotted laminations and the motor housing 3 also helps to effectively isolate the oscillations of the stack of stator laminations, which are caused by the alternating flux, so that these oscillations also will not be picked up by the associated drive apparatus.

Our invention is not limited to the illustrated embodiment. Rather than bevelling the stator slots, an inclined slanted arrangement may be provided of the rotor poles with the obliqueness relatively between slots and the rotor poles being maintained. In addition the bearing plate and its adjacent radial bearing 7 may be joined to form one unit. Further, the material used for the elastic parts is not limited to rubber, and any material can be employed which is characterized by a damping effect on mechanical oscillatory movement.

To those skilled in the art, it will be obvious from a study of this disclosure that our invention permits of various modifications and may be given embodiments other than particularly illustrated and described herein, without departing from the essential features of the invention and within the scope of the claims.

We claim:

1. A midget motor comprising a housing, a slotted stator stack of laminations disposed in and attached to said housing, a rotor having poles and an axis, a pivot bearing having a pivot bearing plate for journalling said rotor in said housing and a stop which limits the axial movement of the rotor, the slots of said stack of stator laminations and the poles of said rotor extending obliquely relative to one another by at least one slot division, said stop including an elastic intermediate member; and the pivot bearing plate of the pivot bearing being connected to the housing by the elastic intermediate member.

2. A motor as claimed in claim 1, further comprising a regulating screw having a cup-shaped portion, said pivot bearing plate being connected to said cup-shaped portion of said regulating screw through said elastic intermediate member.

3. A motor as claimed in claim 1, wherein the stop comprises a buffer disc and an elastic intermediate ring, said rotor being connected to said buffer disc via said elastic intermediate ring and being provided with a recess, said intermediate ring being located in said recess.

References Cited

UNITED STATES PATENTS

| | | | |
|---|---|---|---|
| 3,590,292 | 6/1971 | Poliakoff | 310—90 |
| 3,441,325 | 4/1969 | Sjøtun | 308—135 |
| 2,904,709 | 9/1959 | Lautner | 310—90 |
| 3,396,294 | 8/1968 | Makino | 310—51 |
| 3,483,409 | 12/1969 | Phillips | 310—90 |
| 3,002,794 | 10/1961 | Bluemink | 308—163 |
| 3,418,504 | 12/1968 | Paule | 310—90 |
| 3,469,128 | 9/1969 | Cartier | 310—66 |

ROBERT SKUDY, Primary Examiner

U.S. Cl. X.R.

308—26, 135; 310—40 MM